United States Patent [19]

Kurihara et al.

[11] Patent Number: 5,541,907
[45] Date of Patent: Jul. 30, 1996

[54] CIRCUIT FOR DISCRIMINATING PRE-MASTERED PITS AND PRE-MASTERED GROOVES ON OPTICAL DISK

[75] Inventors: Shinji Kurihara, Ora-gun; Kenji Nakao, Gifu, both of Japan

[73] Assignee: Sanyo Electric Co., Inc., Osaka, Japan

[21] Appl. No.: 407,563

[22] Filed: Mar. 21, 1995

[30] Foreign Application Priority Data

Mar. 22, 1994 [JP] Japan .................................. 6-050730

[51] Int. Cl.$^6$ .................................................. G11B 7/09
[52] U.S. Cl. ...................... 369/124; 369/109; 369/275.4
[58] Field of Search .............................. 369/275.3, 276, 369/109, 112, 124, 275.4

[56] References Cited

U.S. PATENT DOCUMENTS 4,712,206  12/1987  Kanda ..................................... 369/124
4,879,707  11/1989  Getreuer ................................. 369/124

Primary Examiner—David C. Nelms
Assistant Examiner—Son Mai
Attorney, Agent, or Firm—Loeb & Loeb LLP

[57] ABSTRACT

A circuit for performing pre-mastered pit/pre-mastered groove discrimination on an optical disk while an optical pickup traces and traverses tracks. Output signals applied to the input terminal from light receiving elements are summed in an adder circuit and are then applied to first and second transistors. The output signal from the first transistor Is that obtained by envelope detecting the output signal of the adder circuit and is subtracted with the output signal of the second transistor in the subtracter circuit. Then the output signal of the subtracter is compared with a reference value Vref in a comparator circuit. The comparator's output signal according to the result of comparison Is applied to a retrigger monostable multivibrator, which generates an output signal according to the result of pre-mastered pit/pre-mastered groove discrimination. Thus a pre-mastered pit/pre-mastered groove discrimination can be performed with accuracy even while the light pickup traverses pre-mastered pits and pre-mastered grooves.

5 Claims, 4 Drawing Sheets

CIRCUIT FOR DISCRIMINATING PRE-MASTERED PITS AND PRE-MASTERED GROOVES ON OPTICAL DISK

BACKGROUND OF THE INVENTION

1. Field of the Invention

This invention relates to a pre-mastered pit/pre-mastered groove discriminator circuit for discriminating a pre-mastered pit area and a pre-mastered groove area on an optical disk, particularly a recordable magneto optical disk.

2. Description of the Related Art

In recent years, MDs (mini disk) have been proposed which are half the size of CDs (compact disk). An MD, which is a magneto optical disk, is not only reproducible but also recordable using light and magnetism.

Such a recordable ND has a structure in which pre-mastered pits similar to those on a CD are scored on an inner circumferential part of the MD and pre-mastered grooves are spirally formed on an outer circumferential part outside the pre-mastered pit area so that data can be recorded along a pre-mastered groove. In recording signals on the MD, firstly a light pickup traces the pre-mastered pit portion to pick up data indicating a recording condition and then traverses the pre-mastered pit and pre-mastered groove rows, whereupon the light pickup has to be positioned on the pre-mastered groove. In the conventional art, however, since the pre-mastered pit/pre-mastered groove discrimination was impossible during traversing, it was necessary to move the light pickup to a midportion of the pre-mastered groove and then to locate it at the end of the pre-mastered groove so that it would take a long time to start recording.

Having a difference in radial tracking signal, i.e. reflection factor, between pre-mastered pits and pre-mastered grooves, in order to employ a suitable servo control, it is necessary to discriminate as to whether the pre-mastered pit portion or the pre-mastered groove portion is being tracked. To this end, a circuit shown in FIG. 1 of the accompanying drawings has hitherto been proposed for carrying out pre-mastered pit/pre-mastered groove discrimination during tracking. In FIG. 1, output signals of a light receiving element pass through first and second coupling capacitors 3, 4 via their respective input terminals 1, 2 and are then added in an adder circuit 5 using a differential amplifier to form an RF signal. The RF signal is applied to a peak hold circuit 7 via a third coupling capacitor 6 so that a peak value of the RF signal is held. The output signal of the peak hold circuit 7 is compared with a reference value in a comparator circuit 8 which then generates an output signal '1' or '0' according to the result of comparison.

However, the pre-mastered pit/pre-mastered groove discriminator circuit of FIG. 1 cannot perform a pre-mastered pit/pre-mastered groove discrimination during traversing and hence cannot be used to discriminate the start time for recording. Specifically, during traversing, at both the pre-mastered pit and pre-mastered groove areas, an output signal is generated from the adder circuit 5 and a peak value of the output signal is held by the peak hold circuit 7. According to the output signal from the peak hold circuit 7, the comparator 8 generates the signal '1'. That is, no discrimination can be performed during traversing.

SUMMARY OF THE INVENTION

It is therefore an object of this invention to provide a circuit for performing a pre-mastered pit/pre-mastered groove discrimination on an optical disk not only during tracking but also traversing, using an RF signal obtained by adding output signals from a light receiving element and a signal obtained by subtracting an envelope-detected signal, which is obtained by envelope detecting the RF signal, from the RF signal.

Another object of the invention is to provide a circuit for performing a pre-mastered pit/pre-mastered groove discrimination on a mini disc during traversing, in which, after being moved to the vicinity of the border between pre-mastered pit and pre-mastered groove areas, a light pickup can be position at the leading end of the pre-mastered groove, thus reducing a period of time until the start of recording.

According to a first aspect of the invention, there Is provided a pre-mastered pit/pre-mastered groove discriminator circuit for discriminating pre-mastered pits and pre-mastered grooves on an optical disk, comprising: adding means for adding signals read from the optical disk; envelope detecting means for envelope detecting output signals of the adding means; subtracting means for subtracting an output signal of the envelope detecting means from the output signals of the adding means; comparing means for comparing the output signal of the subtracting means with a reference value and generating an output signal according to the result of the comparison; and signal generating means for generating an output signal for only a predetermined period of time according to the output signal of the comparing means.

According to a second aspect of the invention, the pre-mastered pit/pre-mastered groove discriminator circuit performs pre-mastered pit-area/pre-mastered groove-area discrimination on a mini disk when a pickup of a mini disk player traverses the pre-mastered pit and pre-mastered groove areas.

With the arrangement according to the first and second aspects of the invention, the signals read from the optical disk are added in the adding means and are then envelope detected by the envelope detecting means. The output signal of the envelope detecting means is subtracted from the output signals of the adding means In the subtracting means, and the output signal of the subtracting means is then compared with a reference value in the comparing means. The signal generating means generates an output signal according to the output signal of the comparing means. Thus It is possible to perform a pre-mastered pit/pre-mastered groove discrimination, during traversing, by subtracting the output signal of the envelope detecting means from the output signals of the adding means.

According to a third aspect of the invention, there is provided a pre-mastered pit/pre-mastered groove discriminator circuit for discriminating pre-mastered pits and pre-mastered grooves on an optical disk, comprising: an adder circuit for adding signals read from the optical disk; an envelope detector circuit for envelope detecting output signals of the adder circuit; a level adjuster circuit for rendering a maximum value of the output signal of the envelope detector circuit to coincide with a maximum value of the output signals of the adder circuit; a subtracter circuit for subtracting the output signal of the envelope detector circuit from the output signal of the level adjuster circuit; a comparator for comparing the output signal of the subtracter circuit with a reference value; and an oscillator circuit for generating an output signal for a predetermined period of time, with the output signal of the comparator as a trigger signal.

DETAILED DESCRIPTION OF THE PREFERRED EMBODIMENT

Figure 1:
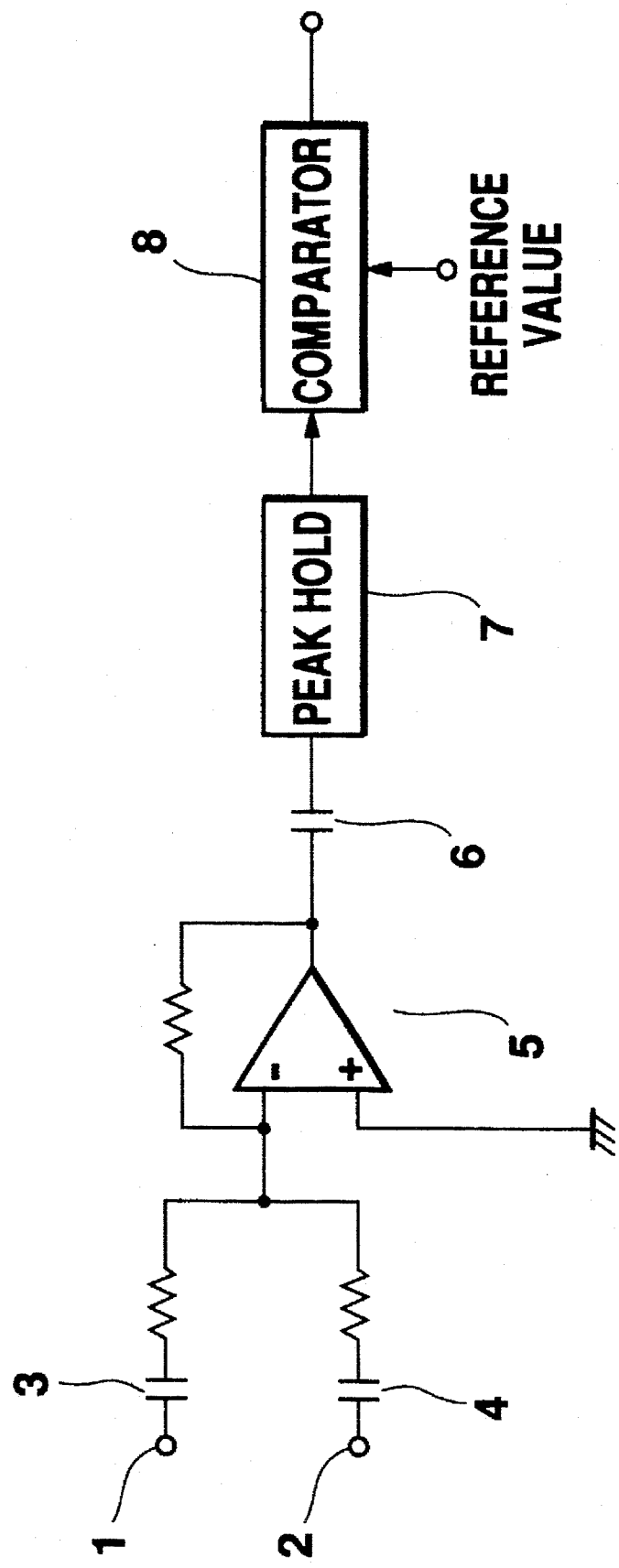
FIG. 1 is a circuit diagram of a pre-mastered pit/pre-mastered groove discriminator according to the related art.
Figure 2:
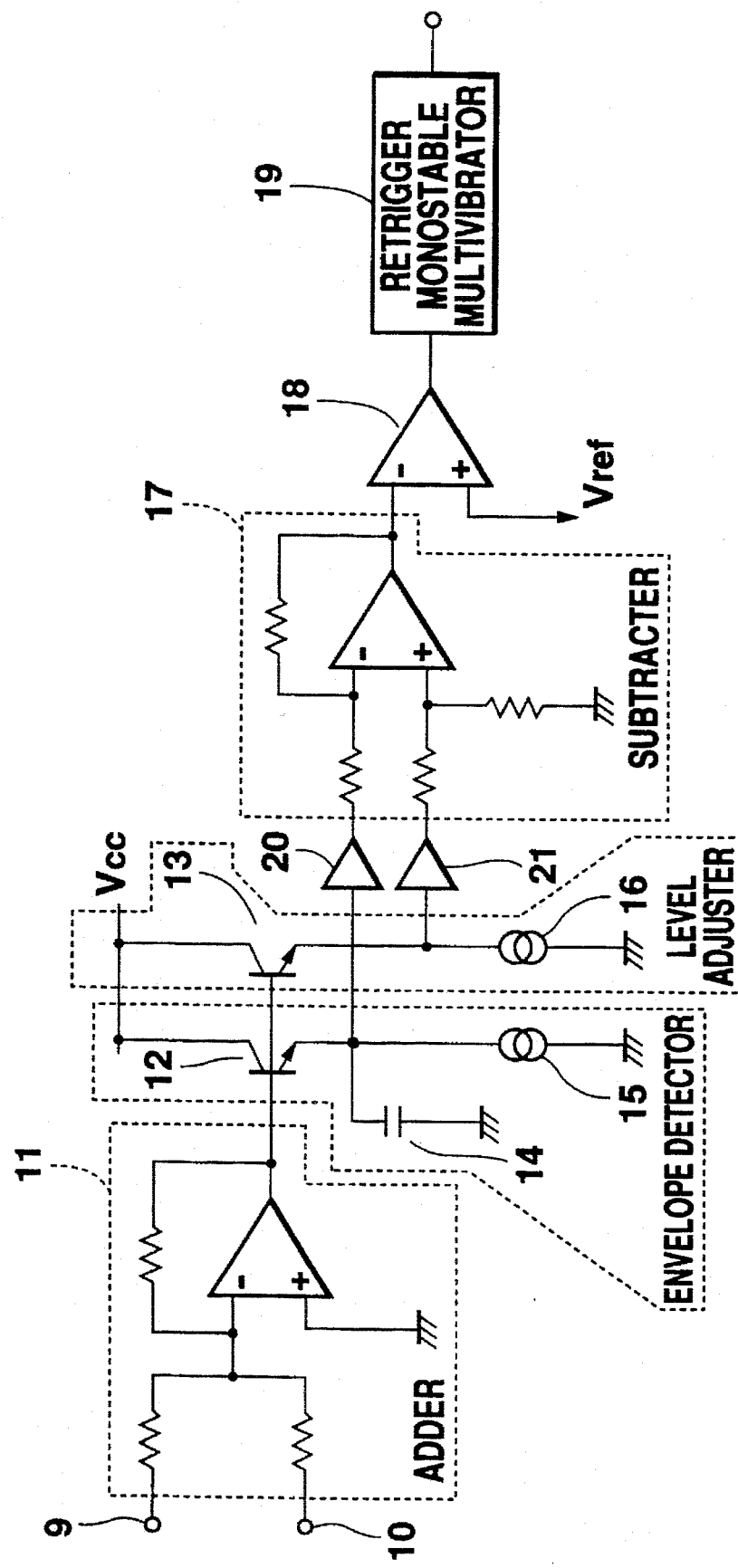
FIG. 2 is a circuit diagram of a pre-mastered pit/pre-mastered groove discriminator according to an embodiment of this invention.

FIG. 2 is a diagram showing a pre-mastered pit/pre-mastered groove discriminator circuit according to an embodiment of this invention. In FIG. 2, reference numerals 9, 10 designate input terminals to which output signals of light receiving elements are to be applied. 11 designates an adder circuit which is composed of a resistor and an operational amplifier and adds up the output signals from the light receiving elements. 12 and 13 designate first and second transistors, to the bases of which the output signal of the adder circuit 11 is to be applied. 14 designates a capacitor connected between the emitter of the first transistor 12 and the ground. 15 and 16 designate first and second constant current sources connected to the respective emitters of the first and second transistors 12, 13. 17 designates a subtracter circuit which is composed of a resistor and an operational amplifier and subtracts the output signals of the first and second transistors 12, 13 one from another. 18 designates a comparator circuit for comparing the output signal of the subtracter circuit 17 with a reference value, and 19 designates a retriggerable monostable multivibrator to which the output signal of the comparator circuit 16 Is to be applied. The first transistor 12, the capacitor 14 and the first constant current source 15 jointly constitute the envelope detector circuit, while the second transistor 13 and the constant current source 16 jointly constitute an emitter follower circuit.

The operation of the circuit of FIG. 2 will now be described with reference to the waveform diagrams of FIGS. 3A through 3E. When the light pickup traverses tracks on the optical disk, the output signals from the first and second light receiving elements are applied to the adder circuit 11 via the respective input terminals 9, 10. In the adder circuit 11, the output signals are added up, and an RF signal as shown in FIG. 3A is generated to the output terminal of the adder circuit 11.

In a pre-mastered pit area on the optical disk, the radial tracking signal of a pre-mastered pit is small, while that of other portions is large. Conversely, in a pre-mastered groove area, the radial tracking signal of a pre-mastered groove is large while that of other portions Is small. Consequently, when the optical pickup traverses the tracks on the rotating optical disk, the adder circuit 11 generates different RF signals for the pre-mastered pit and pre-mastered groove areas as shown in FIG. 3A.

These RF signals are applied to the respective bases of the first and second transistors 12, 13 where they are amplified. Since the capacitor 14 and the first constant current source 15 are connected to the emitter of the first transistor 12, the difference between an emitter current of the first transistor 12 and a constant current of the first constant current source 15 is supplied to the capacitor 14 if the emitter current is larger than the constant current, so that the capacitor 14 is charged. If the emitter current is smaller than the constant current, then the capacitor 14 is discharged. Since the time constant of the capacitor 14 is set so as to vary with the change of the RF signal corresponding to the track, the output signal from the emitter of the first transistor 12 is that obtained by envelope detecting the output signal of the adder circuit 11, i.e. the signal shown In FIG. 3B.

Figure 3A:
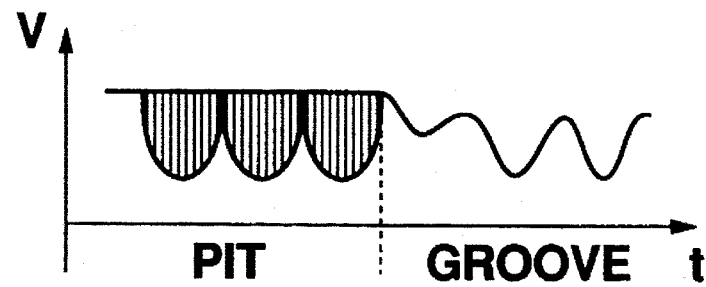
FIG. 3A is a diagram showing an output signal of an adder circuit during traversing.
Figure 3B:
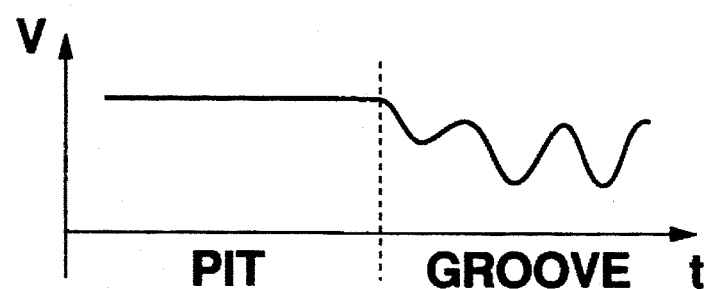
FIG. 3B is a diagram showing an output signal of an envelope detector circuit during traversing.

Further, since the second constant current source 16 is connected to the emitter of the second transistor 13 to form an emitter follower, an output signal from the emitter of the second transistor 13 is a signal whose waveform is similar to that of FIG. 3A. The maximum values of the respective output signals from the first and second transistors 12, 13 are adjusted so as to coincide with one another, as the second transistor 13 and the second constant current source 16 jointly serve as a level adjuster circuit.

Figure 3C:
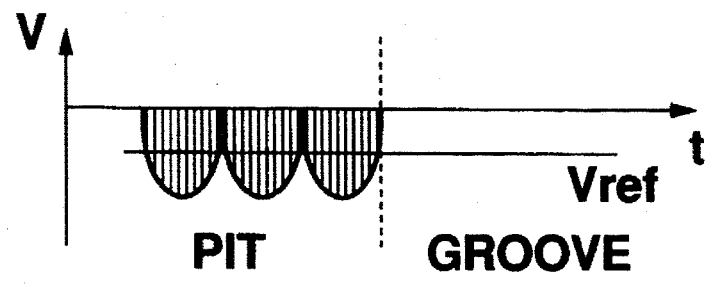
FIG. 3C is a diagram showing an output signal of a subtracter circuit during traversing.

The output signals from the first and second transistors 12, 13 are applied to the subtracter circuit 17 via first and second buffer amplifiers 20, 21, respectively. In the subtracter circuit 17, the output signals are subtracted one from another, and a signal shown in FIG. 3C is generated from the output terminal of the subtracter circuit 17. In FIG. 3C, an output signal is generated when the pickup Is located at the pre-mastered pit area, while no output signal is generated from the subtracter circuit 17 since the output signals from the first and second transistors 12, 13 coincide with one another at the pre-mastered groove area.

The output signal of the substracter circuit 17 is applied to the negative terminal of the comparator circuit 18 where the output signal is compared with a reference value Vref applied to the positive terminal of the comparator circuit 18. If the value of the output signal of the subtracter circuit 17 is smaller than the reference value, the output signal of the comparator circuit 18 is '1'; and if it is larger than the reference value, the output signal of the comparator circuit 18 is '0'. Therefore, as shown in FIG. 3C, if a reference value Vref is provided for the output signal of the subtracter circuit 17, the output signal of the comparator circuit 18 is a signal shown in FIG. 3D.

Figure 3D:
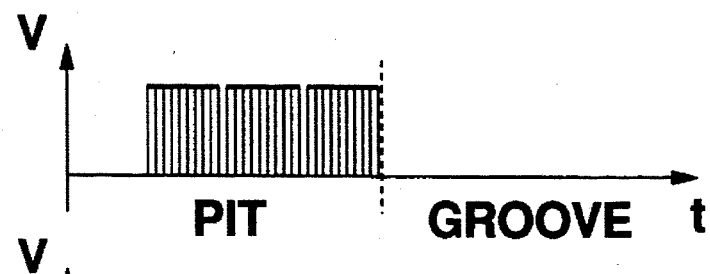
FIG. 3D is a diagram showing an output signal of a comparator circuit during traversing.
Figure 3E:
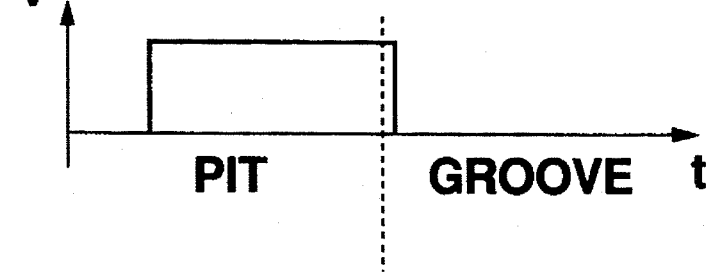
FIG. 3E is a diagram showing an output signal of a retriggerable monostable multivibrator during traversing.

Further, the output signal of the comparator circuit 18 is applied to the retrlggerable monostable multivibrator 19. The retriggerable monostable multivibrator 19 generates an output signal '1' simultaneously with the rise of an input trigger when the input trigger is applied. The retriggerable monostable multivibrator 19 continues generating an output signal '1' after the fall of the input trigger and the output signal will be '0' after the lapse of a predetermined time from the fall of the input trigger. If the next input trigger is applied while the output signal is generated, the generation of the output signal is stopped after the lapse of a predetermined time after the fall of the input trigger. Accordingly, since the predetermined time is set as larger than the inter-signal time of the pre-mastered pit area as shown in FIG. 3D, the output signal of the retrlggerable monostable multivibrator 19 is a signal shown in FIG. 3E. Therefore, the output signal of the circuit of FIG. 2 is '1' at the pre-mastered pit area and '0' at the pre-mastered groove area so that pre-mastered pit/pre-mastered groove discrimination can be performed while the light pickup traverses the tracks.

Figure 4A:
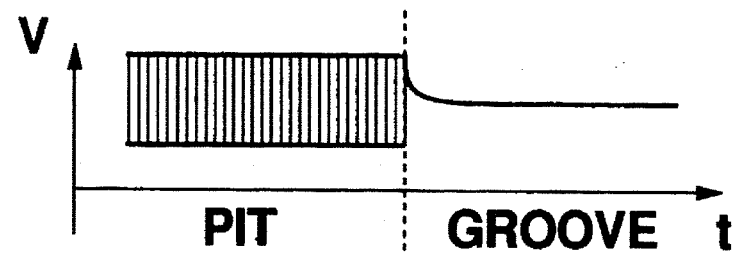
FIG. 4A is a diagram showing an output signal of an adder circuit during tracking.
Figure 4B:
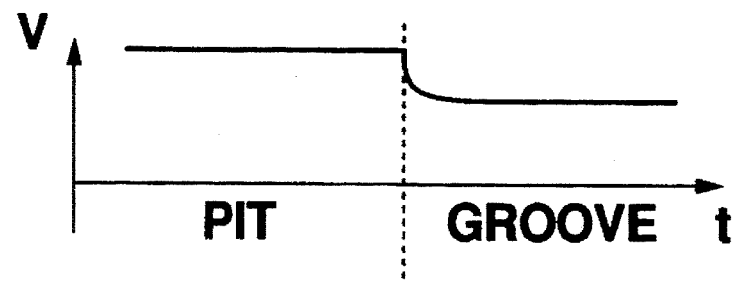
FIG. 4B is a diagram showing an output signal of an envelope detector circuit during tracking.

The output signals of various components of the circuit of FIG. 2 during tracking will now be described using FIGS. 4A through 4E. As the signal of FIG. 4A appears at the output terminal of the adder circuit 11, its waveform is variable according to the pre-mastered pit arrangement at the pre-mastered pit area on the optical disk and is constant at the pre-mastered groove area. Thereafter, when the output signal of the adder circuit 11 is envelope detected, the signal of FIG. 4B appears at the emitter of the first transistor 12. A signal whose waveform is similar to that of FIG. 4A is generated at the emitter of the second transistor 13.

Figure 4C:
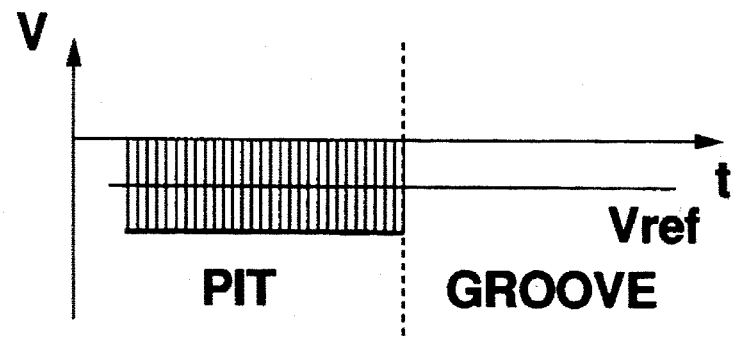
FIG. 4C is a diagram showing an output signal of a subtracter circuit during tracking.
Figure 4D:
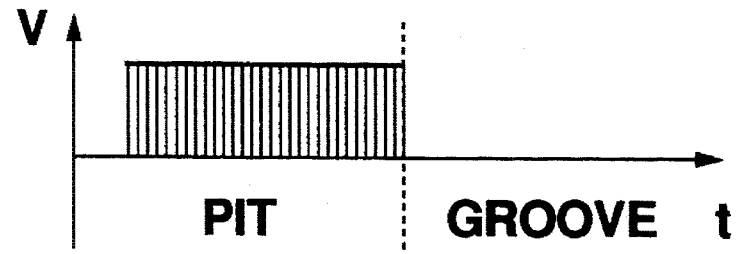
FIG. 4D is a diagram showing an output signal of a comparator circuit during tracking.
Figure 4E:
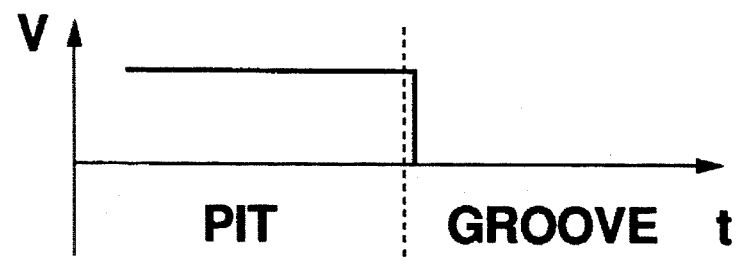
FIG. 4E is a diagram showing an output signal of a retriggerable monostable multivibrator during tracking.

Then, the output signals of the first and second transistors 12, 13 are subtracted one from another, and a signal of FIG. 4C appears at the output terminal of the subtracter circuit 17. In FIG. 4C, a signal appears at the pre-mastered pit area while no signal appears at the pre-mastered groove area. When the output signal of the subtracter circuit 17 of FIG. 4C, a signal of FIG. 4D is generated from the comparator 18. Further, a signal corresponding to the output signal of the comparator circuit 18 is generated from the retrlggerable monostable multivibrator 19, having the waveform of FIG. 4E.

When the light pickup traces the tracks in the pre-mastered pit area, the output signal of the circuit of FIG. 2 is '1'. When the light pickup traces the tracks in the pre-mastered groove area, the output signal of the same circuit is '0'.

In FIG. 2, the first and second transistors 12, 13 are npn transistors. Alternatively they may be pnp transistors. In this case, the collectors of the transistors are connected to ground while the emitters are connected to the first and second constant current sources 15, 16 which are connected to a power supply.

Further, the retriggerable monostable multivibrator 19 may be such that it continues generating an output signal for a predetermined time from the rise of an input trigger.

Therefore, according to this invention, by using an RF signal which is obtained by summing the output signals from the light receiving elements, and a signal which is obtained by subtracting the envelope-detected signal from the RF signal, it is possible to perform pre-mastered pit/pre-mastered groove discrimination not only during tracking but also during traversing.

In reading the data recorded on a mini disk, since a pre-mastered pit/pre-mastered groove discrimination can be performed during traversing, it is possible to move the light pickup to the vicinity of a border between the pre-mastered pit and pre-mastered groove areas and then to locate the light pickup at the leading end of the pre-mastered groove, thus reducing the period of time until the start of recording.

What is claimed is:

1. A pre-mastered pit/pre-mastered groove discriminator circuit for discriminating pre-mastered pits and pre-mastered grooves on an optical disk, comprising:

(a) adding means for adding signals read from the optical disk;

(b) envelope detecting means for envelope detecting output signals of said adding means;

(c) subtracting means for subtracting an output signal of said envelope detecting means from the output signals of said adding means;

(d) comparing means for comparing the output signal of said subtracting means with a reference value and generating an output signal according to the result of the comparison; and (e) signal generating means for generating an output signal for only a predetermined period of time according to the output signal of said comparing means.

2. A pre-mastered pit/pre-mastered groove discriminator circuit according to claim 1, wherein said pre-mastered pit/pre-mastered groove discriminating circuit discriminates a pre-mastered pit area and a pre-mastered groove area on a mini disk system when a pickup of the system traverses the pre-mastered pit and pre-mastered groove areas.

3. A pre-mastered pit/pre-mastered groove discriminator circuit according to claim 1, wherein said envelope detecting means includes a transistor, to a base of which the output signal of said adding means is to be applied, a constant current source connected to an emitter of said transistor, and a capacitor connected to the emitter of said transistor.

4. A pre-mastered pit/pre-mastered groove discriminator circuit according to claim 1, wherein said signal generating means is a retrlggerable monostable multivibrator.

5. A pre-mastered pit/pre-mastered groove discriminator circuit for discriminating pre-mastered pits and pre-mastered grooves on an optical disk, comprising:

(a) an adder circuit for adding signals read from the optical disk;

(b) an envelope detector circuit for envelope detecting output signals of said adder circuit;

(c) a level adjuster circuit for rendering a maximum value of the output signal of said envelope detector circuit to coincide with a maximum value of the output signals of said adder circuit;

(d) a subtractor circuit for subtracting the output signal of said envelope detector circuit from the output signal of said level adjuster circuit;

(e) a comparator for comparing tile output signal of said subtracter circuit with a reference value; and (f) an oscillator circuit for generating an output signal for a predetermined period of time, with the output signal of said comparator as a trigger signal.

\* \* \* \* \*